(12) United States Patent
Lowry et al.

(10) Patent No.: US 8,341,190 B2
(45) Date of Patent: Dec. 25, 2012

(54) MECHANISMS TO SUPPORT MULTIPLE NAME SPACE AWARE PROJECTS

(75) Inventors: Lee Edward Lowry, Orem, UT (US); Volker Gunnar Scheuber-Heinz, Pleasant Grove, UT (US); William Street, Orem, UT (US); Brent Thurgood, Spanish Fork, UT (US); Rajesh Vasudevan, Sandy, UT (US); Ryan Cox, Provo, UT (US); Stephen R Carter, Spanish Fork, UT (US)

(73) Assignee: EMC Corporation, Hopkin ton, MA (US)

( * ) Notice: Subject to any disclaimer, the term of this patent is extended or adjusted under 35 U.S.C. 154(b) by 720 days.

(21) Appl. No.: 12/186,166

(22) Filed: Aug. 5, 2008

(65) Prior Publication Data

US 2010/0036870 A1    Feb. 11, 2010

(51) Int. Cl.
*G06F 7/00* (2006.01)
*G06F 17/30* (2006.01)
(52) U.S. Cl. ........................ 707/796; 707/804
(58) Field of Classification Search ............. 707/796, 707/804
See application file for complete search history.

(56) References Cited

U.S. PATENT DOCUMENTS

| | | | |
|---|---|---|---|
| 6,256,031 B1 | 7/2001 | Meijer et al. | |
| 6,687,701 B2 | 2/2004 | Karamanolis et al. | |
| 6,789,094 B2 | 9/2004 | Rudoff et al. | |
| 6,895,586 B1 | 5/2005 | Brasher et al. | |
| 7,065,784 B2 | 6/2006 | Hopmann et al. | |
| 7,143,421 B2 | 11/2006 | Forin et al. | |
| 7,181,473 B1 | 2/2007 | Lacouture et al. | |
| 7,734,951 B1* | 6/2010 | Balasubramanian et al. | 714/6.13 |
| 2001/0034733 A1* | 10/2001 | Prompt et al. | 707/102 |
| 2002/0078255 A1* | 6/2002 | Narayan | 709/316 |
| 2003/0101434 A1* | 5/2003 | Szyperski | 717/120 |
| 2003/0225753 A1 | 12/2003 | Balassanian et al. | |
| 2005/0108632 A1* | 5/2005 | Friedman et al. | 715/513 |
| 2005/0114771 A1* | 5/2005 | Piehler et al. | 715/536 |
| 2006/0236381 A1 | 10/2006 | Weeden | |
| 2007/0198458 A1 | 8/2007 | Pudipeddi | |
| 2007/0260630 A1 | 11/2007 | Balassanian | |
| 2009/0006888 A1* | 1/2009 | Bernhard et al. | 714/6 |
| 2010/0036869 A1 | 2/2010 | Lowry et al. | |

* cited by examiner

*Primary Examiner* — Mariela Reyes
(74) *Attorney, Agent, or Firm* — Barry N. Young

(57) ABSTRACT

Mechanisms to support multiple name space aware projects are provided. Multiple roots of a project declare multiple namespacing mechanisms. Resources of the project can utilize each of the multiple namespacing mechanisms. In some cases, a particular resource of the project can override and use a foreign namespace that is associated with a different project hierarchy even while that particular resource resides within a project hierarchy associated with the original project and even while the project hierarchy does not declare, at the root, the foreign namespace.

12 Claims, 3 Drawing Sheets

MECHANISMS TO SUPPORT MULTIPLE NAME SPACE AWARE PROJECTS

Collaborative environments are becoming pervasive in the industry. One area of collaboration that is critical to an enterprise is that which is associated with software development.

For example, in a team environment, such as in a software code development environment, many organizations desire to share underlying coding models (object hierarchies) across different projects. With traditional approaches, sharing models can be extremely problematic especially when the models that are to be shared utilize different namespaces (storage mechanisms and interfaces to define, name, and retrieve resources).

A major problem with any solution proposed by an enterprise is how the models are actually serialized and saved to disk. If an enterprise elects to create a super-model that encompasses multiple models in an attempt to unify the different models, then the products of the enterprise become much intertwined with one another and one product can easily break or cause unintended consequences in the other product.

For example, if an enterprise is modeling a product A and decides to delete a particular component within A, this removes all components hierarchically arranged under the component deleted. However, this may remove some key components of A that the enterprise still needs and wants to use with product B (assuming a super model was created by the enterprise to tie A and B together). Essentially, there is no clean model separation between two models or products. Attempting to share super models is also equally problematic for an enterprise.

As a result, enterprises often elect to not share and rather to copy object and sub-object hierarchies over into new namespaces requiring laborious software porting exercises that can sometimes take longer to establish than it would to take to just develop the software for the copied objects (sub-hierarchies) from scratch. This also results in having multiple instances of objects and object hierarchies, each of which need to be supported and maintained by enterprise personnel. Therefore, this scenario is not a desirable situation for any enterprise.

Thus, improved mechanisms are needed for namespacing.

SUMMARY

In various embodiments, mechanisms to support multiple namespace aware projects are provided. More specifically, and in an embodiment, a method is provided for supporting multiple namespaces with a project. A first namespace root object declaration is recognized at a root of a project hierarchy for the project. A second namespace root object declaration is identified at the root of the project hierarchy. A first namespace specification is used for supporting first objects declared under the first namespace root object declaration of the project hierarchy within a first namespace. A second namespace specification is used for supporting second objects declared under the second namespace root object declaration of the project hierarchy within a second namespace.

DETAILED DESCRIPTION

Figure 1:
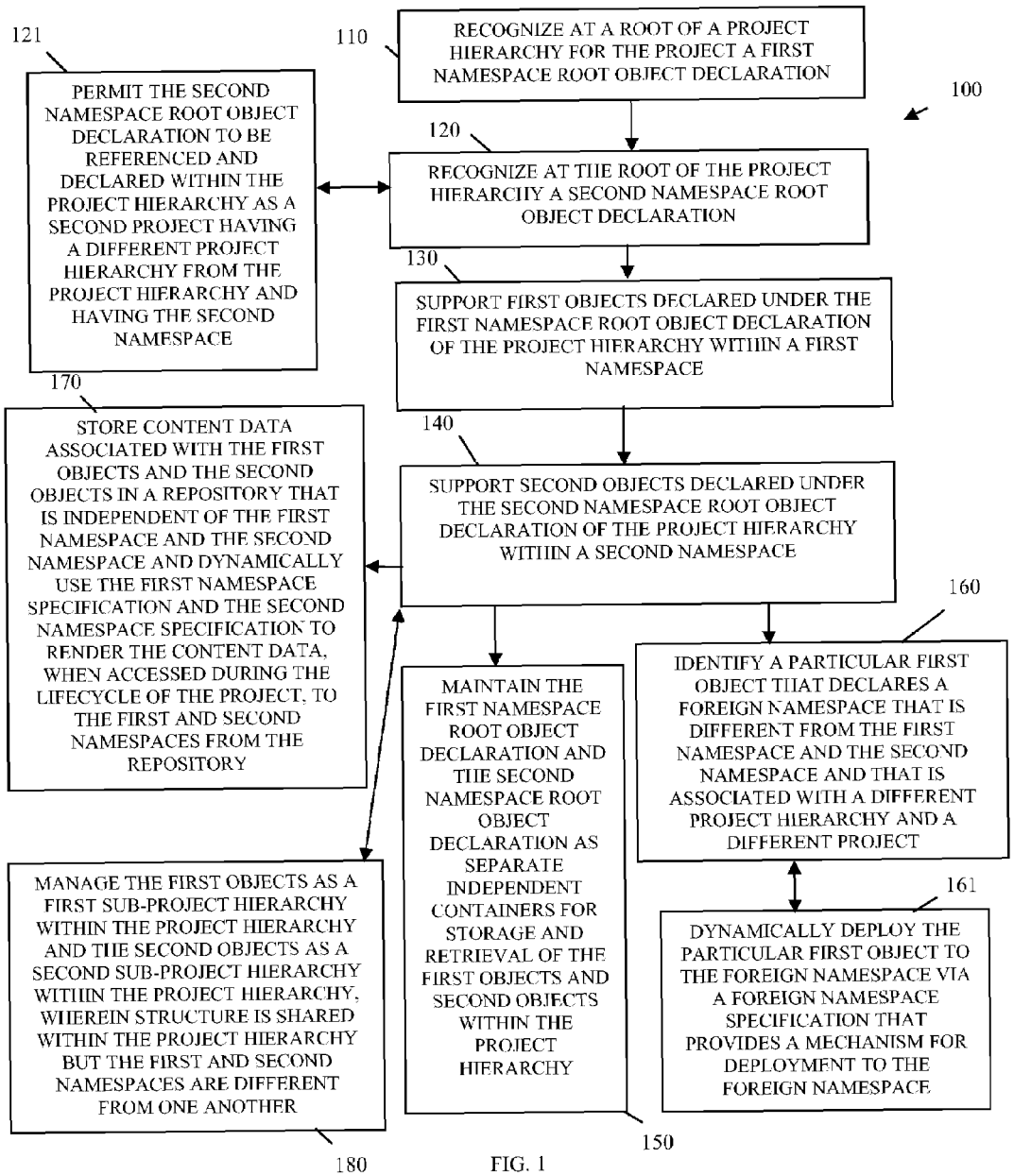
FIG. 1 is a diagram of a method for supporting multiple namespaces with a project, according to an example embodiment.

A "resource" may include a user, content, a processing device, a node, a service, an application, a system, a schema definition, a directory, an operating system (OS), a file system, a data store, a database, a policy definition, a configuration definition, a file, a World-Wide Web (WWW) service, a WWW page, groups of users, combinations of these things, etc. The terms "service," "application," and "system" may be used interchangeably herein and refer to a type of software resource that includes instructions, which when executed by a machine performs operations that change the state of the machine and that may produce output.

An "object" is a particular type of resource that processes as instructions on a machine, such as a computer. The phrase "software module" and the term "object" may be used interchangeably herein and below. Thus, an object is a set of instructions implemented on a computer-readable storage medium that processes on a computer.

A "project" refers to the activity associated with an enterprise or government producing a good (product) or personal service (e.g., financial advice, etc.) for consumption in the marketplace. The activity for the project is defined in various stages of the project's lifecycle, such as by way of example only project definition, project development, project testing, project release, etc. Thus, a "project" is represented and electronically defined as a series of stages associated with the project's lifecycle. Each stage includes its own processing environment having its own or shared resources. So, a stage is represented and electronically defined as one or more resources and their relationships with other resources of the same stage or a different stage. A project may also be viewed as a type of resource.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. A single processing environment may be logically defined, such that it spans multiple different networks (e.g., multiple different LAN's, a LAN and a wide-area network (WAN), etc.).

A "project processing environment" is a processing environment in which any portion (resource) of a project processes within. So, some portions of a project may process within the project processing environment whereas other potions of the project use different processing environments.

A "namespace" refers to a particular context and set of storage interfaces that a particular resource (such as an object) utilizes within its processing environment. So, one namespace may be a specific directory system whereas another namespace may be a relational database system, such as Structured Query Language (SQL). Resources are uniquely named, defined, and referenced within their particular namespace. Also, interfaces (Lightweight Directory Access Protocol (LDAP), SQL, etc.) for accessing, creating, deleting, and modifying resources are consistent within a particular namespace.

Various embodiments of this invention can be implemented in existing network architectures, project processing environments, proxies, directory systems, operating systems, security systems, data centers, and/or communication devices. Any particular architectural layout or implementation presented herein is provided for purposes of illustration and comprehension only and is not intended to limit aspects or embodiments of the invention.

It is within this context, that various embodiments of the invention are now presented with reference to the FIGS. 1-4.

FIG. 1 is a diagram of a method 100 for supporting multiple namespaces with a project, according to an example embodiment. The method 100 (hereinafter "namespace aware project service") is implemented as instructions in a machine-accessible and readable medium. The instructions when executed by a machine (processor and memory enabled device, such as a computer, etc.) perform the processing depicted in the FIG. 1. The namespace aware project service is also operational over and processes within a network. The network may be wired (including connections via fiber), wireless, or a combination of wired and wireless.

As will be more fully described herein and below, the namespace aware project service permits a single project to declare and use multiple namespaces and in some cases borrow namespaces from other project hierarchies associated with other projects.

Initially, a project processing environment is established. The project processing environment includes a network of machines having a same or multiple different processing environments within which each machine (computer) operates. A project is defined via a schema definition and that schema definition defines each of the objects that process within the context of the project and the relationships that exists between the objects of the project.

At 110, the namespace aware project service recognizes at a root of a project hierarchy a first namespace root object declaration. The first namespace root object declaration is a type of object declaration or piece of metadata associated with a project. The project being defined by the project hierarchy via a project specification. The namespace aware project service uses the project hierarchy and the project specification to install, load, modify, delete, and create resource objects for the project during a lifecycle of the project.

So, when the namespace aware project service scans the project hierarchy it encounters the special first namespace root object declaration. This may be a specification for a particular namespace or it may be a reference to a specification for the particular namespace. An example namespace may include specific schemas in such services as eDirectory®, SQL, etc. eDirectory® and SQL are examples of services or systems that permit namespaces to be defined and instantiated.

At 120, the namespace aware project service also identifies at the root of the project hierarchy a second namespace root object declaration. So, the root of the project hierarchy is defined with multiple root namespace declarations, namely the first and second namespace root object declarations. The two defined namespaces (first and second namespaces) are different and disparate from one another, such as when the first namespace is defined in eDirectory® and the second namespace is defined in SQL. Of course it is understood that any two disparate namespaces can be used and the namespaces do not specifically have to be defined within eDirectory® and/or SQL.

In an embodiment, at 121, the namespace aware project service permits the second namespace root object declaration to be referenced and declared within the project hierarchy as a second project. That is, the second namespace root object declaration is a reference to a second project that has a different project hierarchy from the project hierarchy and that is associated with the second namespace. So, the project hierarchy can reference other projects and their hierarchies to utilize their corresponding namespaces and structure.

At 130, the namespace aware project service uses a first namespace specification to support first objects, which are declared under the first namespace root object declaration of the project hierarchy within a first namespace. That is, first objects (resources) that are to be configured and used with the project are defined within the project hierarchy after the first namespace root object declaration and this organization within the project hierarchy indicates to the namespace aware project service that the first objects are to be configured, installed, managed, and used within the first namespace (defined by the first namespace specification). Again, the first namespace root object declaration provides the mechanism by which the namespace aware project service acquires and identifies the first namespace specification. Furthermore, the namespace aware project service knows that the first objects are to be configured and managed within the first namespace because the definitions and declarations of the first objects occur within the project hierarchy immediately following the first namespace root object declaration. Also, as was stated above, the first namespace root object declaration is present at the root of the project hierarchy.

Similarly, at 140, the namespace aware project service uses a second namespace specification for supporting second objects that are declared under the second namespace root object declaration of the project hierarchy within a second namespace. So, the root of the project hierarchy includes two new and novel object declarations (a first namespace root object and a second namespace root object), all definitions of resources (objects) that are defined within the project hierarchy after one these root namespace objects are managed by the namespace aware project service within a particular namespace.

The location of the definitions associated with the first objects within the project hierarchy permit the namespace aware project service to resolve that the first objects are to be used within the first namespace. Likewise, the location of the definitions associated with the second objects within the project hierarchy permit the namespace aware project service to resolve that the second objects are to be used within the second namespace.

The namespace aware project service permits a single project to declare and use multiple namespaces. Each set of objects is configured, managed, and loaded within each set's defined namespace.

According to an embodiment, at 150, the namespace aware project service maintains the first namespace root object declaration and the second namespace root object declaration as separate independent containers for storage and retrieval of the first objects and the second objects within the project hierarchy. In other words, the first namespace root object declaration is a container for the first namespace, which has its own storage conventions and interfaces. Each first object is logically configured and used within the first namespace container defined by the first namespace root object declaration within the project hierarchy. Similarly, the second namespace root object declaration is another and different container for the second namespace, which has its own storage conventions and interfaces that are different from that which was associated with the first namespace. Again, each second object is logically configured and used within the second namespace container defined by the second namespace root object declaration within the project hierarchy.

In an embodiment, at 160, the namespace aware project service identifies a particular first object that declares a foreign namespace. The foreign namespace is different from both the first namespace and the second namespace. In fact, the foreign namespace is associated with an entirely different project hierarchy and different project. Essentially, a particular first object, within its definition, overrides the first namespace to which it is to be associated and borrows the hierarchy structure and namespace associated with a different project.

One mechanism for the namespace aware project service to permit the embodiment depicted at 160 is for the namespace aware project service, at 161, to dynamically deploy the particular first object to the foreign namespace via a foreign namespace specification that provides a mechanism for the deployment to the foreign namespace.

According to another situation, at 170, the namespace aware project service storage content data associated with the first objects and the second objects in a repository that is independent of the first namespace and the second namespace. The namespace aware project service then dynamically uses the first namespace specification and the second namespace specification to render the content data, when it is accessed during the lifecycle of the project, to their respective first and second namespaces. This provides a storage technique that is independent of any particular namespace. In an embodiment, intermediate storage or repository can represent the content in an extensible markup language (XML) format.

In an embodiment, at 180, the namespace aware project service manages the first objects as a first sub-project hierarchy within the project hierarchy and the second objects as a second sub-project hierarchy within the project hierarchy. Structure of the sub-hierarchies is shared across and within the project hierarchy but the first and second namespaces to which the first and second objects are deployed is different from one another.

The namespace aware project service permits multiple root namespace objects to be declared within a single project hierarchy. Each root namespace object has a unique namespace. The namespace aware project service tracks the project and associates its objects (resources) at the root namespace level of the project. Each root namespace object can contain one to many other objects. Each object can itself include other sub-objects. Each root namespace object is at the top of the project hierarchy. For example, a Project A may appear as follows:

| Project A |
|---|
| eDirectory® |
| Objects X, Y |
| Designer Diagram® |
| Objects B, C |
| SQL |
| Object Z |

Project A has objects (X, Y, B, C, and Z) that are saved under the project hierarchy (Project A) in multiple different namespaces (eDirectory®, Designer Diagram®, and SQL). The root namespace objects (eDirectory®, Designer Diagram®, and SQL) server as containers for the objects (X, Y, B, C, and Z) so that 1) they can stored to disk; and so that 2) the disk storage works in a team-enabled version controlled project environment such that multiple projects or major features of a single project do not clash with one another.

With this multi-root technique, an enterprise can easily have multiple products, features, models, etc. all based on a single core project or model and this is achievable in the safest manner when it comes to the underlying disk and file storage.

Another major benefit of this is that if an object is moved in one model (or project), the move does not affect the location of the dependent objects in another model or project. This is a tremendous plus in a team-enabled/version controlled environment. Moving dependent objects does not affect the underlying storage of the objects. The objects are still stored in the same root namespace location. This provides stability and allows for mixing project hierarchies and projects in a team-enabled and version controlled environment.

All objects that sit under a namespace root can be assumed to have that namespace without having to stamp the object with a particular namespace. If a specific namespace is declared on a specific object then this can be used to override the assumption. This can occur with barnacle objects. These are objects that attach themselves to another namespace. Specific definitions in the foreign project hierarchy and the barnacle object itself can be used to alert the namespace aware project service to this situation and provide for processing, such as what was described above at 160-161.

Figure 2:
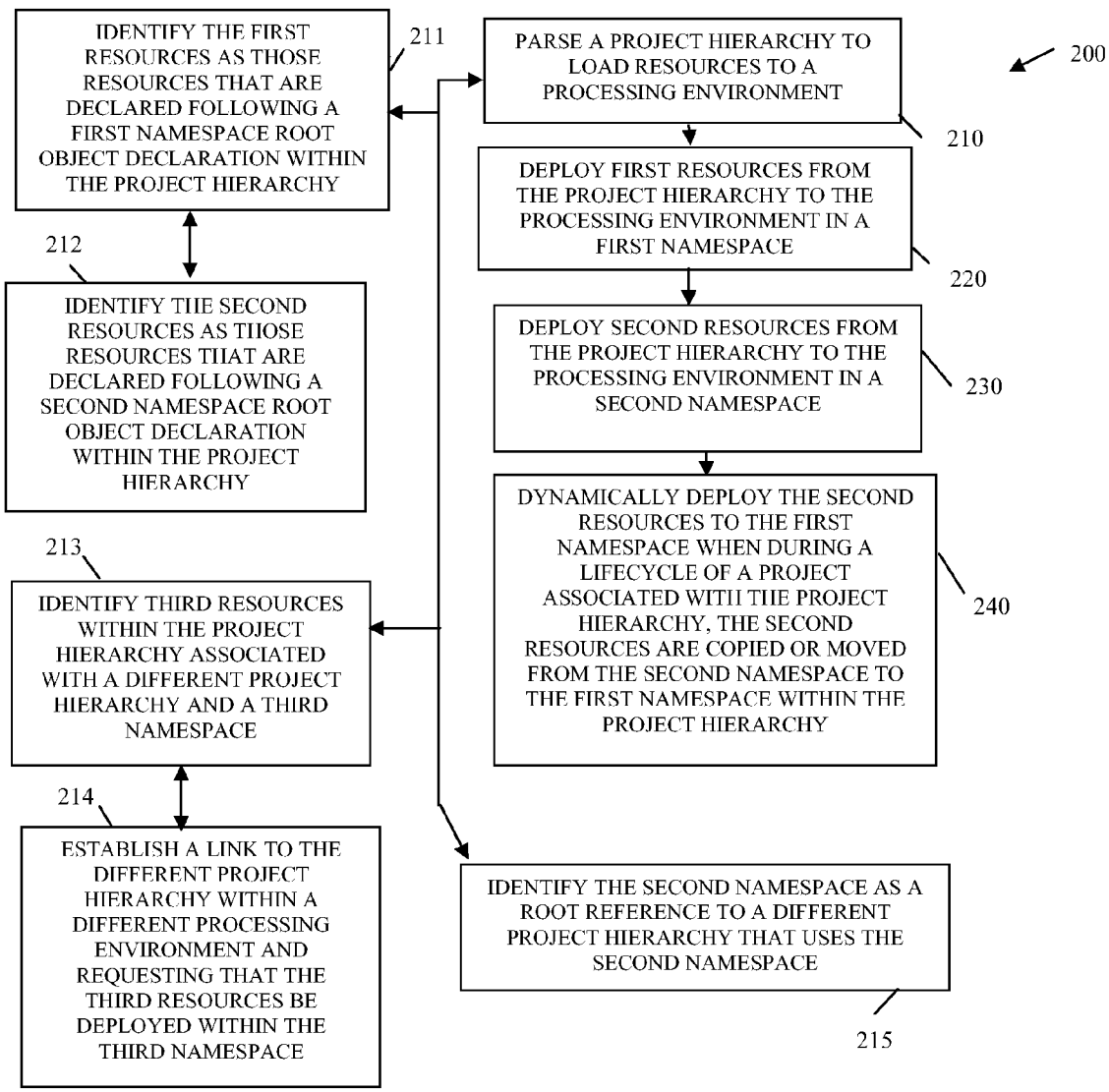
FIG. 2 is a diagram of another method for deploying multiple namespaces with a project, according to an example embodiment.

FIG. 2 is a diagram of another method 200 for deploying multiple namespaces with a project, according to an example embodiment. The method 200 (hereinafter "project namespace deployment service") is implemented as instructions in a machine-accessible and readable medium. The instructions when executed by a machine perform the processing depicted in the FIG. 2. The project namespace deployment service is also operational over and processes within a network. The network may be wired, wireless, or a combination of wired and wireless.

The project namespace deployment service represents another processing perspective to the namespace aware project service represented by the method 100 discussed above with the FIG. 1.

At 210, the project namespace deployment service parses a project hierarchy to load resources to a processing environment. The project hierarchy is represented via a project specification for a project. The project specification includes relationships between resources, via the hierarchical structure, configuration information for the resources, and identity and security information for the resources.

In an embodiment, at 211, the project namespace deployment service identifies first resources as those resources that are declared following a first namespace root object declaration within the project hierarchy. So, a relationship between first resources and a first namespace root object declaration is established and identified by the project namespace deployment service when those first resources and their definitions follow a first namespace root object declaration within the project hierarchy that the project namespace deployment service is parsing.

Similarly, at 212, the project namespace deployment service identifies the second resources as those resources that are declared following a second namespace root object declaration within the project hierarchy.

According to an embodiment, at 213, the project namespace deployment service identifies third resources within the project hierarchy associated with a different project hierarchy and a third and different namespace (from the first and second namespaces). Here, the project namespace deployment service can ignore these barnacle resources or as in the case, at 214, the project namespace deployment service can dynamically establish a link to the different project hierarchy within a different processing environment and then request that the third resources be deployed within that third namespace.

In some cases, at 215, the project namespace deployment service identifies the second namespace as a root reference to a different project hierarchy that uses or is associated with the second namespace. So, a reference to another project with a different namespace can be used within the project hierarchy to identify or obtain the second namespace.

At 220, the project namespace deployment service deploys first resources from the project hierarchy to the processing environment in the first namespace.

Similarly, at 230, the project namespace deployment service deploys second resources from the project hierarchy to the processing environment in a second namespace.

In an embodiment, at 240, the project namespace deployment service dynamically deploys the second resources to the first namespace when during a lifecycle of a project associated with the project hierarchy; the second resources are copied or moved from the second namespace to the first namespace within the project hierarchy. So, the project hierarchy can be modified to copy, move, add, and delete resources. The project namespace deployment service can uses namespace specifications and translation scripts to achieve the migration between namespaces.

Figure 3:
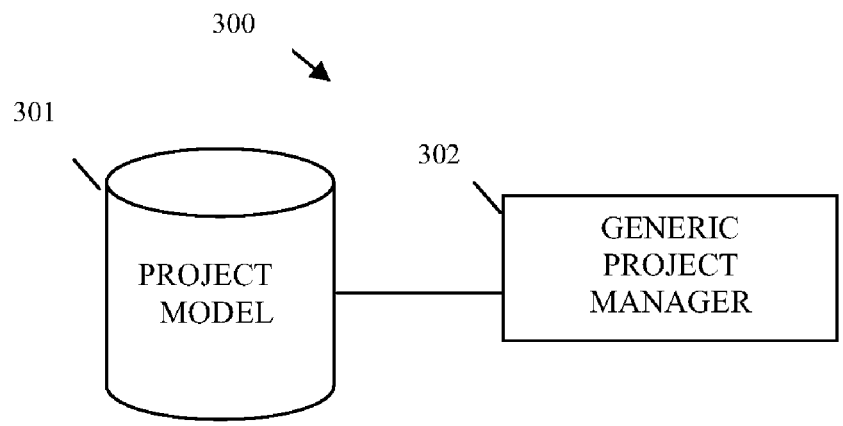
FIG. 3 is a diagram of a multiple namespace aware project management system, according to an example embodiment.

FIG. 3 is a diagram of a multiple namespace aware project management system 300, according to an example embodiment. The multiple namespace aware project management system 300 is implemented as instructions on or within a computer-readable storage medium and a machine-accessible and readable medium. The instructions when executed by a machine (computer, etc.) perform various aspects of the processing depicted with respect to the method 100 of the FIG. 1 and the method 200 of the FIG. 2. The f multiple namespace aware project management system 300 is also operational over a network and the network may be wired, wireless, or a combination of wired and wireless.

The multiple namespace aware project management system 300 includes a project model 301 and a generic project manager 302. Each of these components and their interactions with one another will now be discussed in turn.

The project model 301 is implemented in a machine-accessible and a computer-readable storage readable medium and is accessible to services (such as the generic project manager 302) that process on machine(s) within the network. Some example aspects of the project model 301 were presented above with reference to the methods 100 and 200 of the FIGS. 1 and 2, respectively.

In an embodiment, the project model 301 is a project specification that includes definitions, references to policy, authentication information, security information, relationship information, and other configuration information that permit object (resources) of a project to be instantiated, configured, and managed within a processing environment.

The project model 301 is organized as an object hierarchy. Each object definition within the hierarchy representing a particular project resource. A special object is referred to as a root object that is declared at the root of the object hierarchy. The root object identifies a particular namespace that is to be used with the project hierarchy. A project model 301 and its object hierarchy include multiple root objects that define multiple namespaces, which the project utilizes.

According to an embodiment, at least one root object is defined within the object hierarchy as a reference to a different project model having a different object hierarchy and associated with a particular namespace.

In an embodiment, particular resources associated with a particular namespace are declared within the object hierarchy following a particular root object. So, structurally resources associated with a particular namespace immediately follow the root object that defines that namespace within the object hierarchy.

The generic project manager 302 is implemented in a machine-accessible and computer-readable storage medium and is to process on the same machine as the project model 301 is natively accessed from or on an entirely different machine of the network. Example processing associated with the generic project manager 302 was presented in detail above with reference to the methods 100 and 200 of the FIGS. 1 and 2, respectively.

The generic project manager 302 selectively loads the resources to the multiple namespaces in response to the object hierarchy. That is, the generic project manager 302 installs, loads, and manages resources of the project via the object hierarchy associated with the project model 301. Each resource is associated with a particular namespace in response to its location within the object hierarchy and its association to a particular root object that defines that particular namespace.

According to an embodiment, the generic project manager 302 permits each resource defined within the object hierarchy to override its namespace assignment. This is a form of barnacle object discussed in detail above with reference to the methods 100 and 200 of the FIGS. 1 and 2, respectively.

In a particular situation, the generic project manager 302 requests an external generic project manager to deploy a particular resource to a particular namespace when that particular resource borrows structure and the particular namespace from a different project model associated with a different object hierarchy. So, different instances of the generic project manager 302 can cooperate to permit objects from one project model 301 to borrow and share structure from objects of another project model 301. Namespaces can also be shared although they do not have to be in each instance.

In some cases, the generic project manager 302 uses translation utilities or scripts to permit each of the resources to be moved and used between the multiple namespaces within the object hierarchy. So, the object hierarchy can move resources associated with one namespace to another namespace within the same object hierarchy. The generic project manger 302 can achieve this via translation utilities or scripts that dynamically process and translate the storage between the disparate namespaces.

Figure 4:
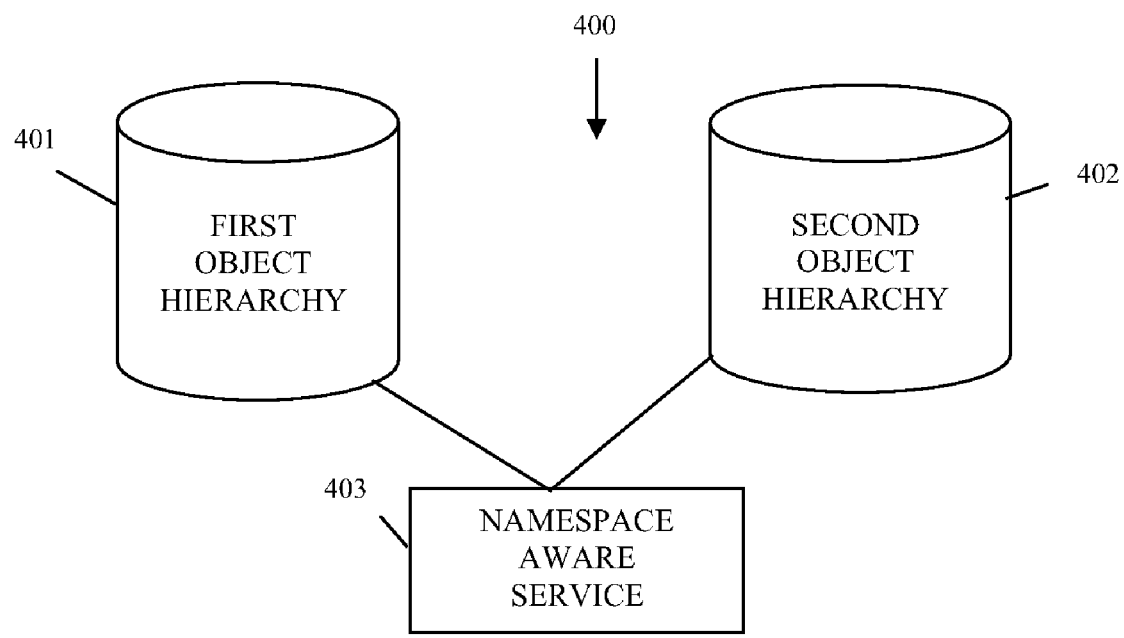
FIG. 4 is a diagram of another multiple namespace aware project management system, according to an example embodiment.

FIG. 4 is a diagram of another multiple namespace aware project management system 400, according to an example embodiment. The multiple namespace aware project management system 400 is implemented as instructions on or within a machine-accessible and computer-readable storage medium. The instructions when executed by a machine (such as a computer) perform various aspects of the processing depicted with respect to the methods 100 and 200 of the FIGS. 1 and 2, respectively, and processing associated with the system 300 of the FIG. 3. The multiple namespace aware project management system 400 is also operational over a network and the network may be wired, wireless, or a combination of wired and wireless.

The multiple namespace aware project management system 400 includes a first object hierarchy 401, a second object hierarchy 402, and a namespace aware service 403. Each of these components and their interactions with one another will now be discussed in turn.

The first object hierarchy 401 is implemented in a machine-accessible and computer-readable storage medium and defines a first project.

Similarly, the second object hierarchy 402 is implemented in a machine-accessible and computer-readable storage medium and defines a second project.

In an embodiment, the first object hierarchy 401 includes special root objects that define each of the multiple namespaces.

The namespace aware service 403 is implemented in a machine-accessible and computer-readable storage medium and is to process on a machine of the network. Example processing associated with the namespace aware service 403 was provided in detail above with reference to the methods 100 and 200 of the FIGS. 1 and 2, respectively, and with reference to the system 300 of the FIG. 3.

The namespace aware service 403 permits first objects associated with the first object hierarchy 401 of a first project to deploy and use multiple namespaces. The namespace aware service 403 also permits selective first objects of the first object hierarchy 401 to borrow structure from other namespaces associated with the second object hierarchy 402 of a second project.

According to an embodiment, some of the first objects include namespace overrides that force the namespace aware service 403 to deploy those first objects to a specific namespace defined by those namespace overrides.

In a particular situation, a particular namespace for a particular first object is resolved by the namespace aware service 403 by a location of a definition for that particular first object within the first object hierarchy 401.

The namespace aware service 403 utilizes namespace specifications to deploy the first objects to each of the multiple namespaces.

It is now appreciated how a single project model can be loaded and managed utilizing multiple different namespaces. This is achieved via multiple root aware objects that define specific namespaces for a project at the root level. Such techniques permit project hierarchy sharing and more flexibility in cross-project management techniques within an enterprise.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for supporting multiple namespaces, comprising:
    recognizing at a root of a project hierarchy of a project a first namespace root object declaration, the first namespace root object declaration defining a first namespace associated with said project;
    recognizing within said project hierarchy a second namespace root object declaration defining a second namespace associated with said project;
    supporting first objects declared under the first namespace root object declaration of the project hierarchy within the first namespace, the first namespace having its own data storage conventions and interfaces, the first objects are associated with the first namespace by being organized under the first namespace root object and the root objects are not stamped with any particular namespace;
    supporting second objects declared under the second namespace root object declaration of the project hierarchy within the second namespace, the second namespace having its own data storage conventions and interfaces that are different from the first namespace, the second objects are associated with the second namespace by being organized under the second namespace root object and the second objects are not stamped with any particular namespace; and
    managing the first objects as a first sub-project hierarchy within the project hierarchy and the second objects as a second sub-project hierarchy within the project hierarchy, wherein structure is shared within the project hierarchy but the first and second namespaces are different from one another.

2. The method of claim 1 further comprising, maintaining the first namespace root object declaration and the second namespace root object declaration as separate independent containers for storage and retrieval of the first objects and second objects within the project hierarchy.

3. The method of claim 1 further comprising, identifying a particular first object that declares a foreign namespace that is different from the first namespace and the second namespace and that is associated with a different project hierarchy and a different project.

4. The method of claim 3 further comprising, dynamically deploying the particular first object to the foreign namespace via a foreign namespace specification that provides a mechanism for deployment to the foreign namespace.

5. The method of claim 1, wherein recognizing the second namespace root object declaration further includes permitting the second namespace root object declaration to be referenced and declared within the project hierarchy as a second project having a different project hierarchy from the project hierarchy and having the second namespace.

6. The method of claim 1 further comprising, storing content data associated with the first objects and the second objects in a data storage repository that is independent of the first namespace and the second namespace, and dynamically using a first namespace specification and a second namespace specification to retrieve and render the content data, when accessed during the lifecycle of a project, to the first and second namespaces from the data storage repository.

7. A machine-implemented system, comprising:
    a project model for a project implemented in a machine-accessible and computer-readable storage medium and accessible to services that process on a machine of a network; and a generic project manager implemented in a machine-accessible and computer-readable storage medium and to process on the machine or a different machine of the network;

wherein the project model is organized as an object hierarchy, each object representing a resource of the project, and wherein multiple independent namespaces are declared as objects within the object hierarchy and are associated with said project, and the generic project manager selectively loads resources to the multiple namespaces in response to the object hierarchy, each namespace having its own data storage conventions and interfaces, and each object is not stamped with any particular namespace, rather each object is assigned to a given namespace based on its organization under a particular namespace object within the object hierarchy, the objects assigned to said namespaces being managed within different sub-project hierarchies within said project model; and a data storage repository that is independent of said multiple namespaces for storing content data associated with said multiple objects.

8. The system of claim 7, wherein at least one object is defined within the object hierarchy as a reference to a different project model having a different object hierarchy and being associated with a different particular namespace.

9. The system of claim 7, wherein particular resources associated with a particular namespace are declared within the object hierarchy following a particular object.

10. The system of claim 7, wherein the generic project manager permits each resource defined within the object hierarchy to override its namespace assignment and be used with a different namespace.

11. The system of claim 7, wherein the generic project manager requests an external generic project manager to deploy a particular resource to a particular namespace when that particular resource borrows structure and the particular namespace from a different project model associated with a different object hierarchy.

12. The system of claim 7, wherein the generic project manager uses translation utilities to permit each of the resources to be moved and used between the multiple namespaces within the object hierarchy.

* * * * *